United States Patent
Broggi et al.

(10) Patent No.: US 8,164,432 B2
(45) Date of Patent: Apr. 24, 2012

(54) APPARATUS, METHOD FOR DETECTING CRITICAL AREAS AND PEDESTRIAN DETECTION APPARATUS USING THE SAME

(75) Inventors: Alberto Broggi, Parma (IT); Pietro Cerri, Lodi (IT); Ho-gi Jung, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 338 days.

(21) Appl. No.: 12/471,878

(22) Filed: May 26, 2009

(65) Prior Publication Data
US 2009/0303026 A1 Dec. 10, 2009

(30) Foreign Application Priority Data
Jun. 4, 2008 (KR) .................. 10-2008-0052738

(51) Int. Cl.
*B60Q 1/00* (2006.01)
(52) U.S. Cl. .................. 340/435; 340/436; 340/425.5; 382/103
(58) Field of Classification Search .................. 340/435, 340/425.5, 903, 436, 944; 382/103, 104; 348/148, 149
See application file for complete search history.

(56) References Cited

U.S. PATENT DOCUMENTS

| 6,337,637 | B1 * | 1/2002 | Kubota et al. | 340/901 |
| 6,956,469 | B2 * | 10/2005 | Hirvonen et al. | 340/435 |
| 7,418,112 | B2 * | 8/2008 | Ogasawara | 382/103 |
| 7,672,514 | B2 * | 3/2010 | Chang et al. | 382/199 |
| 7,786,898 | B2 * | 8/2010 | Stein et al. | 340/937 |

* cited by examiner

*Primary Examiner* — Toan N Pham
(74) *Attorney, Agent, or Firm* — McDermott Will & Emery LLP

(57) ABSTRACT

An apparatus, method for detecting critical areas and a pedestrian detection apparatus using the same are provided. An application of the pedestrian detection system is provided to help limit critical urban environment to particular areas. Contrary to traditional pedestrian detection systems that localize every pedestrians appearing in front of the subject vehicle, the apparatus first finds critical areas from urban environment and performs a focused search of pedestrians. The environment is reconstructed using a standard laser scanner but the subsequent checking for the presence of pedestrians is performed by incorporating a vision system. The apparatus identifies pedestrians within substantially limited image areas and results in boosts of timing performance, since no evaluation of critical degrees is necessary until an actual pedestrian is informed to the driver or onboard computer.

12 Claims, 14 Drawing Sheets

APPARATUS, METHOD FOR DETECTING CRITICAL AREAS AND PEDESTRIAN DETECTION APPARATUS USING THE SAME

TECHNICAL FIELD

The present invention relates to an apparatus, method for detecting critical areas and a pedestrian detection apparatus using the same. More particularly, the present invention relates to an apparatus for protecting pedestrians by first locating environmental barriers of a subject vehicle and then searching for pedestrians among the barriers and a method therefor.

BACKGROUND OF THE DISCLOSURE

Traditional pedestrian detection systems are based on searches for all of the pedestrians appearing in front of the vehicle. In such pedestrian detection systems, candidate pedestrians are located using human characteristics such as legs' motion pattern, symmetry, shape, motion and periodicity. When fusion between different sensing technologies was used, the respective sensors search out pedestrian-specific features while becoming a high or a low level.

These approaches of the conventional pedestrian detection systems fail to produce an optimal result because they are adapted to recognize certain generic urban environments and detect pedestrians in a large area ahead of the vehicle.

DISCLOSURE OF THE INVENTION

In order to solve the problems identified above, the present disclosure is designed to work in a particularly challenging urban scenario so that a search of vehicles at halt is followed by priority searches for pedestrians in close proximity of the searched vehicles or in invisible areas behind the vehicles.

One embodiment of the present invention provides a critical area detector in a pedestrian detection apparatus for detecting pedestrians about vehicles comprising a critical area detection unit, which upon receiving a distance data generated from detecting environmental obstacles of the vehicles, identifies the environment of the vehicles and moving obstacles using the distance data in order to detect as critical areas a preset environment and the areas surrounding the moving obstacles.

Another embodiment of the present invention provides a pedestrian detection apparatus for detecting pedestrians about a vehicle comprising an image generator for capturing images of an environment of the vehicle to generate and deliver image outputs, a sensor for sensing obstacles about the vehicle and delivering distance data between the obstacles and the vehicle, a critical area detector using the distance data to identify the vehicle environment and moving obstacles and detect as critical areas a preset environment and the areas surrounding the moving obstacles, and a pedestrian detector for detecting the pedestrians preferentially from images corresponding to the critical areas.

Yet another embodiment of the present invention provides a critical area detection method in a pedestrian detection apparatus for detecting pedestrians about a vehicle comprising (a) correcting a distance data upon receiving the same from a sensor according to positional changes of the vehicle, (b) clustering the distance data as chains of segments by connecting between corrected distance data in a close proximity, (c) merging the segments by connecting the clustered distance data segments and merging the segments in parallel and in a close proximity into a polyline, (d) merging lines by integrating polylines in a close proximity into a single merged line, (e) classifying obstacles through classification of polylines according to their size and shape into multiple categories in order to detect multiple categories of obstacles, (f) classifying the obstacles through correcting the polylines according to the vehicle positional changes and classifying the polylines into multiple categories according to the degree of overlap between the polylines before correction and the polylines after correction in order to detect multiple categories of obstacles; and (g) identifying critical areas through identifying the environment and the moving obstacles with using the multiple categories of obstacles detected in the steps (e) and (f) of classifying the obstacles in order to detect the critical areas.

As described above, according to the present disclosure, upon detecting every specific environment structure, i.e. stopped vehicles that may hide the pedestrians their possible presence is checked in specific areas thereby implementing a novel pedestrian detection apparatus to promote traffic safety and avoid any possible collisions with frail road users.

This solution also focuses on a particularly critical environment, typical of urban accidents.

Besides directly providing detections of dangerous situations, the present disclosure also boosts timing performance, since the computationally intensive part—vision-based pedestrian recognition—is performed only on limited portions of the image.

Hereinafter, preferred embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

I. Introduction

The present disclosure suggests a pedestrian detection system based on a new approach. In particular, the present disclosure is devised to work in a particularly challenging urban scenario, in which traditional pedestrian detection approaches could not yield optimal results. Moreover, instead of searching for pedestrians in a large area ahead of the vehicle with the system and in a generic urban situation, the system of the present disclosure focuses on a specific scenario in which not only the detection of a pedestrian is of basic importance, but the danger of the situation can be clearly assessed as well.

In fact, in an automotive system, a correct detection is just the first phase of a successful product: the localization of a traffic sign/traffic light/obstacle or pedestrian with no corresponding indication on its position with respect to the vehicle and the environment provides very little information, which makes the detection system incomplete. As an example, a pedestrian detection system able to correctly localize all the pedestrians present in the scene provides a huge amount of information, that still needs filtering in order to be useful to either the driver or the on-board computer for automatic maneuvers. A possible filter may be implemented by fusing information coming from other systems, such as lane detection or other situation analysis engines, and CAN (controller area network) data: a pedestrian exactly in front of the vehicle may or may not be considered as dangerous depending on the environment as shown in FIGS. 1A to 1C.

Figure 1A:
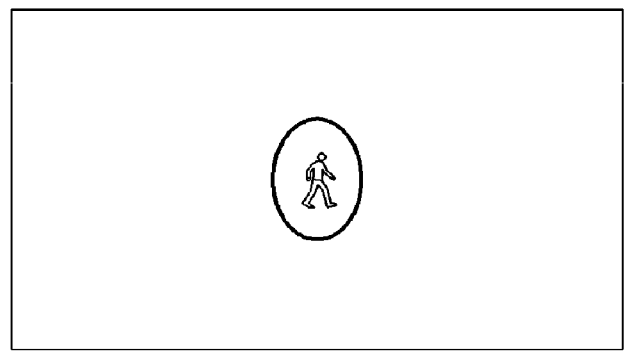
FIGS. 1A to 1C illustrate how a pedestrian in front of the vehicle may or may not be considered as dangerous depending on the environment according to an embodiment of the present disclosure.
Figure 1B:
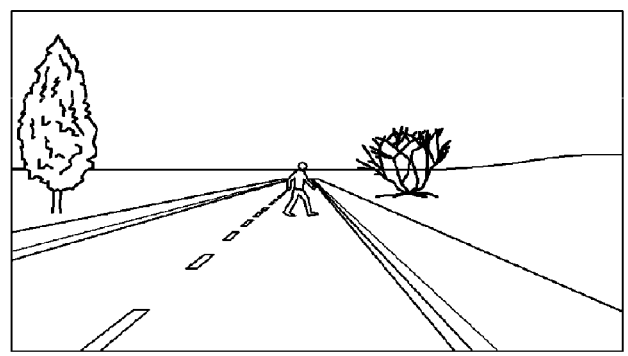
Figure 1C:
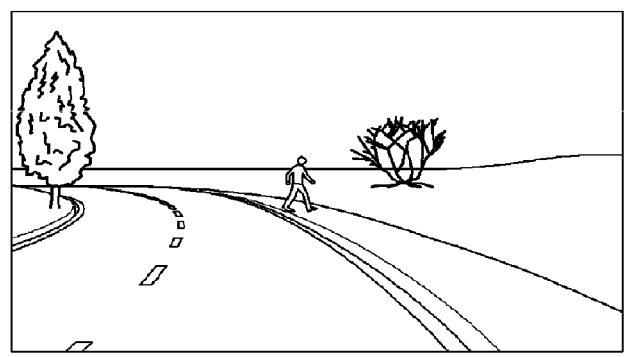

FIGS. 1A to 1C illustrate how a pedestrian in front of the vehicle may or may not be considered as dangerous depending on the surrounding environment according to an embodiment of the present disclosure.

As shown FIG. 1A, when a pedestrian is localized but no reference with respect to the environment is provided, the detector is not able to assess the danger level. When environmental information is fused, the very same pedestrian may become a threat as depicted in FIG. 1B, or may be deemed alright in a safe position as in FIG. 1C.

The present disclosure approaches the problem in the opposite way: instead of detecting all possible candidates and filtering them out after the analysis of the environment, the system of the present disclosure first assesses the scenario, and then searches for possible pedestrians in specific positions in that particular scenario.

In this way, all pedestrians who will be detected are possible threats and no further filtering is needed (apart from a validation and a possible final tracking step). The scenarios that are considered in this disclosure refer to the very common urban situations in which the presence of a pedestrian poses a serious problem that could be mitigated by an early detection. In particular, when vehicles are moving on an urban road, the only threat that a pedestrian may pose—therefore requiring a successful detection—is a road crossing. Conversely, stopped vehicles on the road or on the road sides create a completely new set of scenarios, in which the presence of a pedestrian might be absolutely dangerous. The underlying idea of the instant disclosure is to localize stopped vehicles and then search for pedestrians in the close proximity of these vehicles or in the areas hidden by them. These stopped vehicles, whose edges will trigger the search for pedestrians, can be parked cars on the road edge, vehicles temporarily stopped on the road, or vehicles queued in a line in front of a traffic light, zebra crossing, or simply jammed.

FIGS. 2A to 2D illustrate different situations considered and areas of interest to be detected with possible pedestrians according to an embodiment of the present disclosure.

Figure 2A:
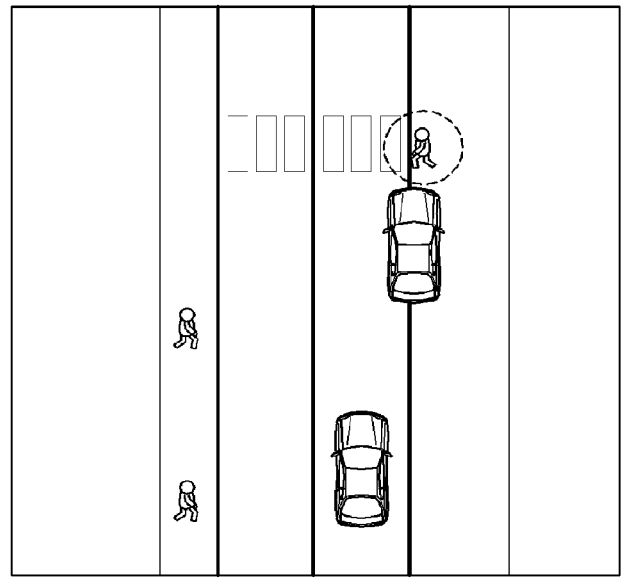
FIGS. 2A to 2D illustrate different situations considered and areas of interest to be detected for having possible pedestrians according to an embodiment of the present disclosure.
Figure 2B:
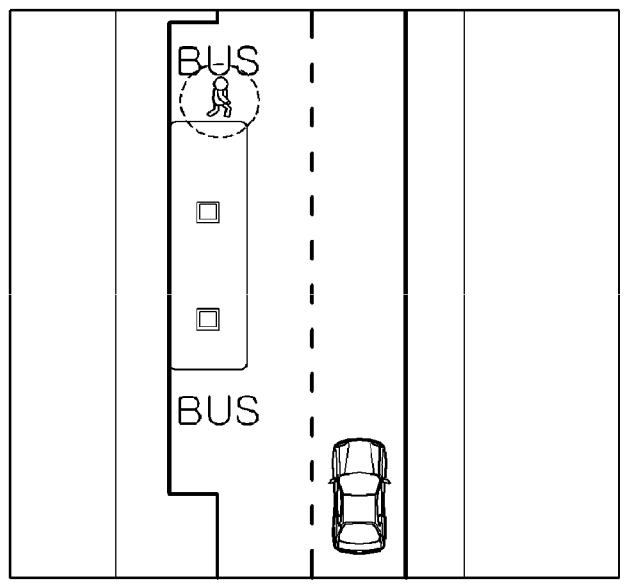
Figure 2C:
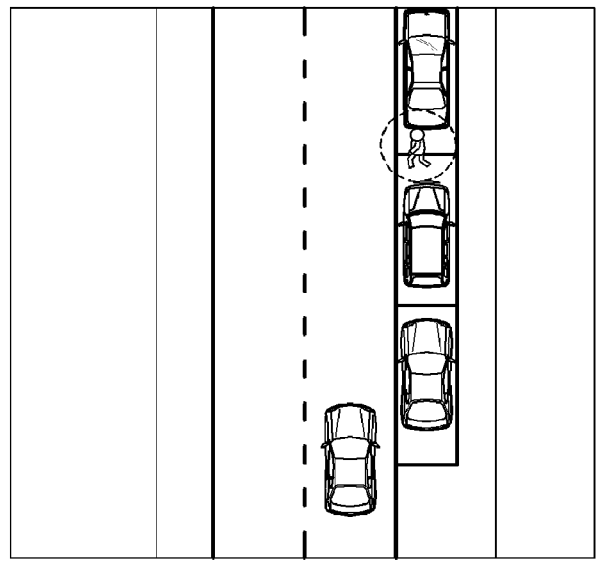
Figure 2D:
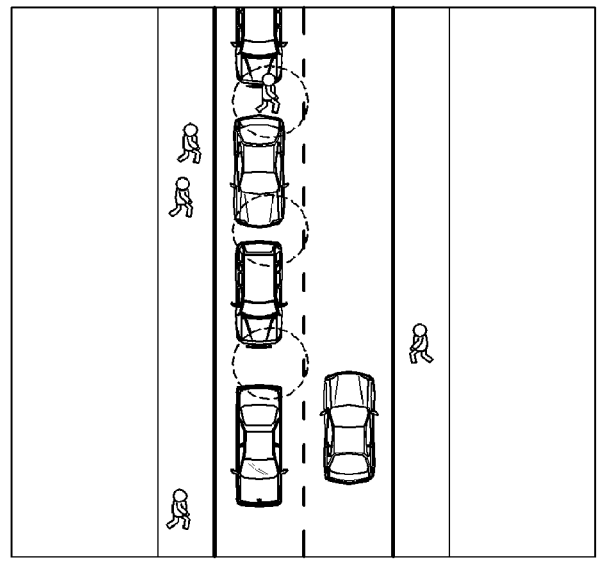

FIGS. 2A to 2D generally depict situations considered in this disclosure wherein areas of interest indicated by dotted circles are considered for the detection of a possible pedestrian. In FIG. 2A, a crossing pedestrian is hidden by a parked vehicle. In FIG. 2B, a pedestrian is crossing the road behind a stopped bus. In FIG. 2C, a pedestrian is popping out in between two parked vehicles. FIG. 2D shows a pedestrian crossing the road between two vehicles stopped on the other side of the road. It is important to note that situations in FIGS. 2A and 2B refer to specific and localized urban areas (zebra crossings and bus stops) while situations FIGS. 2C and 2D may happen in any portion of the road network.

FIGS. 2A to 2D show some examples of situations in which the visibility of a crossing pedestrian is occluded by stopped vehicles. The highlighted areas by dotted circles of FIGS. 2A-2D for the respective situations are the areas on which the system will perform a check for the presence of a possible pedestrian. A straightforward extension, which is not currently investigated in this disclosure, may be used to locate large static structures (such as buildings or guard-rails) and treat them as stopped vehicles as in the above description.

In other words, this disclosure focuses on the detection of pedestrians popping out behind stopped vehicles; pedestrians that are clearly visible in the frontal area of the vehicle can also be detected, but this function that is common to other systems than the disclosure will not be detailed here.

The idea of focusing on a specific scene is not new to the field of pedestrian detection systems. In this art, a module has been developed to detect balls, which are usually a strong signature of the presence of a child.

It is known that parked vehicles, blocking the visibility of pedestrians, are one of the main causes of accidents: in residential areas, in fact, parking spaces should be arranged diagonally. However, as shown in FIGS. 2A-2D, there are situations in which vehicles stop temporarily on the road and their position cannot be strategically organized and carefully managed as in the case of parking lots. Although some of these situations refer to specific urban areas i.e. zebra crossings and bus stops that could be specifically enhanced by intelligent infrastructures aimed at warning oncoming vehicles, other situations can happen in any spot of the road network, making the installation of intelligent infrastructures impractical.

The main characteristic required by such a system is the capability to:

1. detect pedestrians quickly, given the short working range and the particular danger of an imminent collision;

2. detect pedestrians as soon as they appear, therefore even when they are still partly occluded; and 3. limit the search to given areas, determined by a quick pre-processing.

Figure 3:
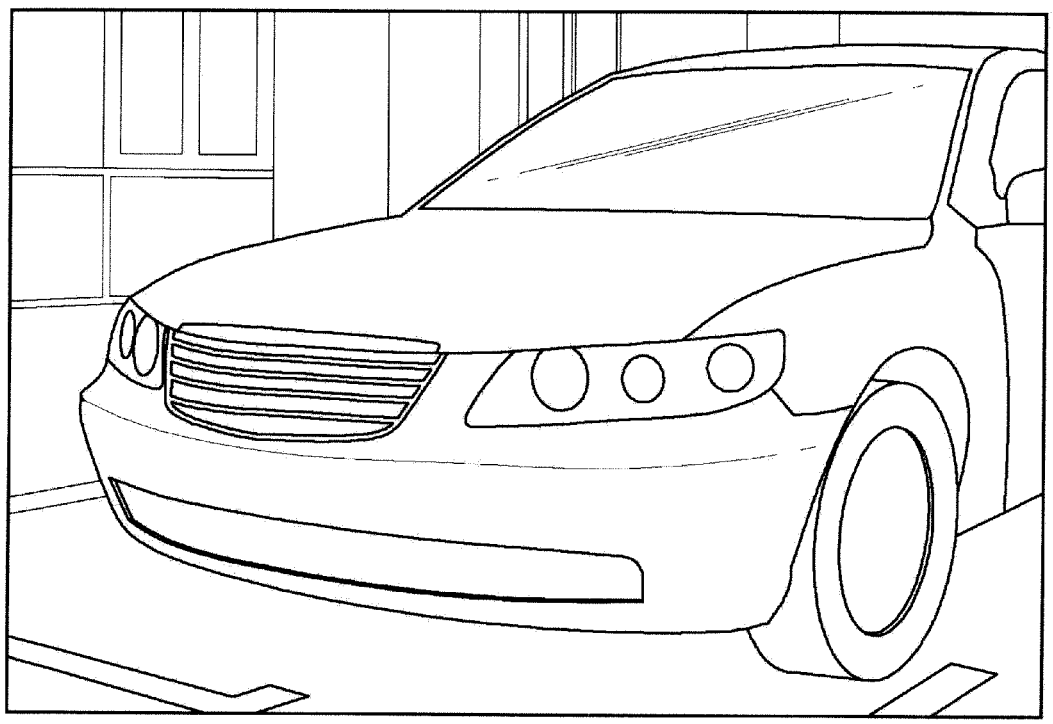
FIG. 3 illustrates a test vehicle according to an embodiment of the present disclosure.

The system presented in the present disclosure addresses a specific application of a pedestrian detection system, which is in field tests on a model of passenger car pictured as in FIG. 3.

In the next section the test vehicle setup is presented, and then in section III a description of the risky area detection can be found. In section IV considerations about vision fusion are discussed, and in section V some final remarks are exposed.

II. The Test Vehicle

A. Sensing Technologies

Being designed to address an urban scenario in which the prototype vehicle is running close to stopped vehicles, a limitation on vehicle speed and detection range is straightforward. Low-to-medium vehicle speeds up to 50 km/h and a detection range of about 40 m can be considered as a safe choice.

Environmental sensing requires the stopped vehicles to be detected; a laser based solution is sufficiently strong to localize large obstacles like vehicles and classify them thanks to their shapes. To overcome the lack of speed information associated with laser scans, a particular laser scanner was selected with the specific characteristic of providing interlaced data. It groups a number of interlaced scans together to form a single higher resolution scan. The analysis of this interlaced data coupled to vehicle CAN data allows to estimate obstacles speed and therefore to localize vehicles with null speeds.

The best technology to check for the presence of a pedestrian in a given set of specific spots is vision. Monocular vision is sufficient since no 3D reconstruction is needed and an estimation of the distance is readily available. Although the system was tested in daylight conditions, the use of a NIR (Near Infrared) camera and proper illumination allows extending its operational range to the night.

B. Sensor Selection

The camera may have sensitivity both in the visible and NIR spectra. Additional head lamps are mounted in front of the vehicle. A NIR LED headlight with an aperture of about 25° is mounted in front of the radiator, and the high beams are customized by SL (Super Light) to block the visible light and illuminate in the NIR spectrum only.

The laser scanner may be a SICK LMS 211-30206. The suitable detection capabilities may include scanning angle of 100°, minimum angular resolution of 0.25°, up to 80 meters range, and fog correction. The laser scanner may be capable of 1° resolution, but performing 4 subsequent rotations, using an interlacing system, and a phase-gap of 0.25 degrees, it is possible to decrease the final granularity to 0.25°. Every rotation may take 13.32 ms, so, in 53.28 ms four rotations are performed.

The measurement of time difference between pulses is negligible; moreover when the vehicle is moving, the shift between the position of the laser scanner when the first pulse is measured, and the position when the last pulse is measured is appreciable: the interlacing system of the laser scanner make this problem even more evident.

C. Vehicle Setup

A compact PC may be mounted in the boot or trunk, while a laser scanner and two different NIR head lamps may be located in the front bumper. The NIR camera may be placed inside the cabin near the rear-view mirror of the vehicle as shown in FIG. 3.

III. Focus of Attention

Two different laser data classifications are developed in order to make the algorithm robust. Both methods are based on pulses clustering into straight lines, but, while the first one considers only the last scan to classify obstacles, the second one uses a fixed number of previous scans to verify the previous position of obstacles and therefore estimate their speed.

A. Data Correction

As already explained in section II, shifts between subsequent laser scanner measurements can be appreciable: this feature may cause clustering or classification problems, because obstacles shape may appear distorted. Using ego motion data provided on the CAN, it is possible to compute the roto-translation of the vehicle and correct the position measured for each pulse.

Figure 4A:
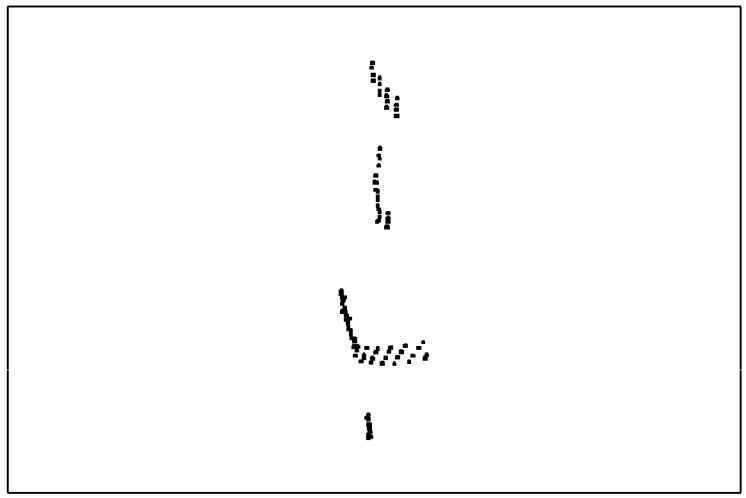
FIGS. 4A and 4B illustrate a raw laser data and corrected data referring to non-moving obstacles.
Figure 4B:
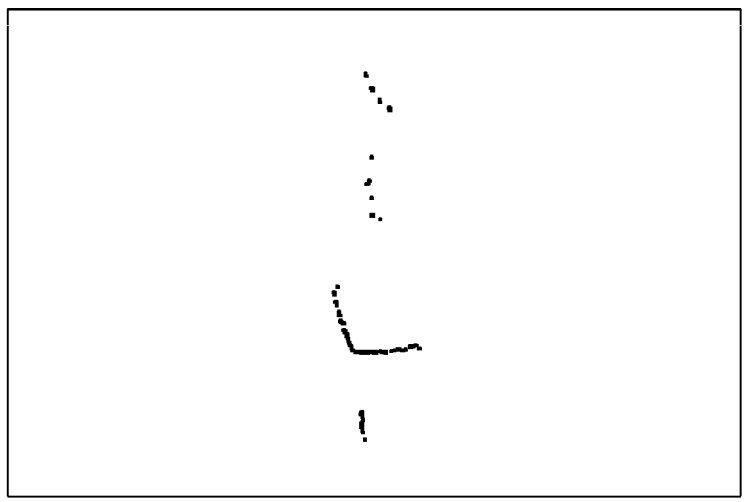

FIGS. 4A and 4B show raw laser data and corrected data referring to non-moving obstacles, respectively. The four rotations that create a scan are clearly visible before the correction, while the obstacle appears as a single line after the correction. Pulses echoed by moving obstacles cannot be reduced to a single line, since the position of the obstacle changes during the scan: moving obstacles are identified by four parallel lines after the data correction. This information can become very useful for obstacle classification.

B. Data Clustering

Connecting subsequent pulses, while discarding information about the rotation at which the pulse belongs to, works for all situations except for moving obstacles. Better results can be obtained by connecting only the pulses that belong to the same rotation: moving obstacles are then identified by four different and parallel clusters. The pulses are clustered as chains of segments. The points that cannot be joined into any chain of the same rotation, are then tested for merging with points of other rotations considering proximity only. The points that cannot be connected to any other point or are on the border of laser scanner range (about 80 meters) are permanently discarded.

C. Segment Merging

Up to now pulses are joined in a chain of segments without any other information. Adjacent segments with approximately the same orientation can be merged into a longer segment, preserving the obstacle shape, but reducing the complexity of the data structure and the details of the representation. Each chain is then segmented into a polyline.

Figure 5:
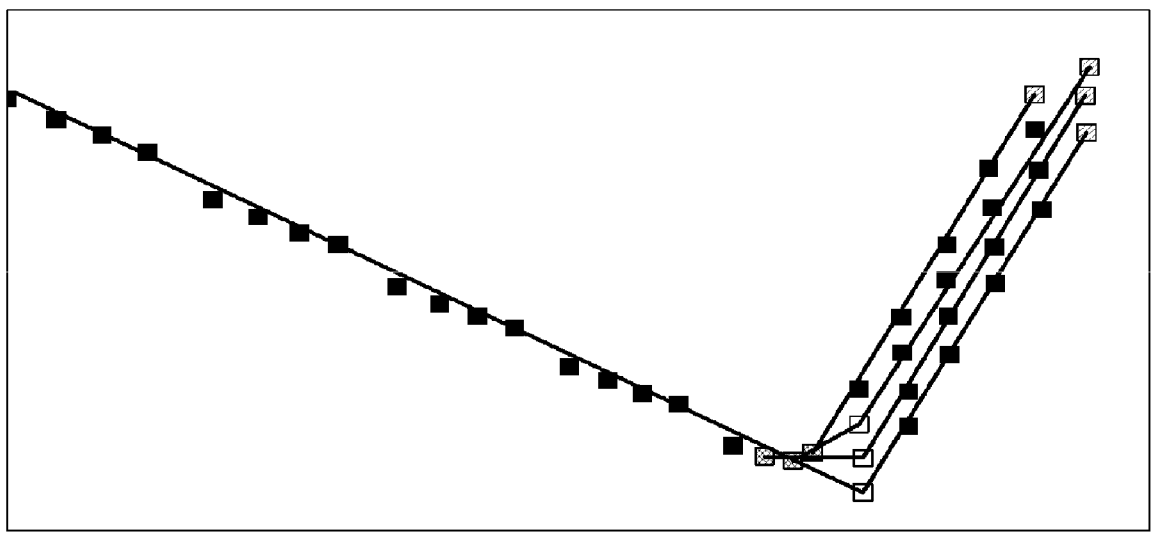
FIG. 5 illustrates a moving vehicle where a single line corresponds to a vehicle side and four parallel lines correspond to its bumper.

FIG. 5 illustrates a moving vehicle wherein the four parallel lines correspond to its bumper, while the single line corresponds to its side. Cross-hatched dots are polylines start points, blank dots are points in the middle of polylines, diagonal-hatched dots are polylines end points, solid dots are points belonging to a line. FIG. 5 shows a moving vehicle wherein the rear bumper is framed as four parallel lines, while its side, that it is parallel to the vehicle movement direction, is marked by a single line.

D. Lines Merging

Figure 6A:
FIGS. 6A to 6C illustrate steps of lines merging algorithm for locating and classifying static and moving obstacles.
Figure 6B:
Figure 6C:

Every obstacle in the field of view of the laser scanner is identified by four lines, one for each rotation that composes the whole high resolution scan. In the case of static obstacles the four lines are quite perfectly overlapping, thanks to the previous data correction, and can be merged. Conversely in the case of moving obstacles the lines are parallel but not overlapping, therefore static and moving obstacles can be located and correctly classified. FIGS. 6A-6C show the steps of the algorithm where FIG. 6A shows data clustering and FIG. 6B an approximation using polylines.

FIG. 6C shows the final result where all the points are merged into a single line: in order to simplify the following steps, little drifts are ignored. This quick and simple, yet very effective, process to identify static obstacles may generate false negatives when the vehicle's pitch is not negligible.

Section V will discuss this issue.

E. First Obstacle Classification

The obtained polylines can be classified according only to their size and shape. It is possible to divide obstacles into five categories:

possible pedestrian; road border; L-shaped obstacle; moving obstacle, and generic obstacle.

Obstacles that can eventually be classified as pedestrians are supposed to have a reduced size, while obstacles that have a large size and are almost parallel to the vehicle, are assumed to be road borders (guard-rails, road infrastructures, . . . ). A simple and fast method, based on lines orientation, may be used to detect L-shaped obstacles. Moving obstacles may be already individuated in the previous step of the algorithm. All obstacles that are not yet classified may be tagged as generic obstacles. The results obtained so far are satisfactory as shown in FIG. 7.

Figure 7:
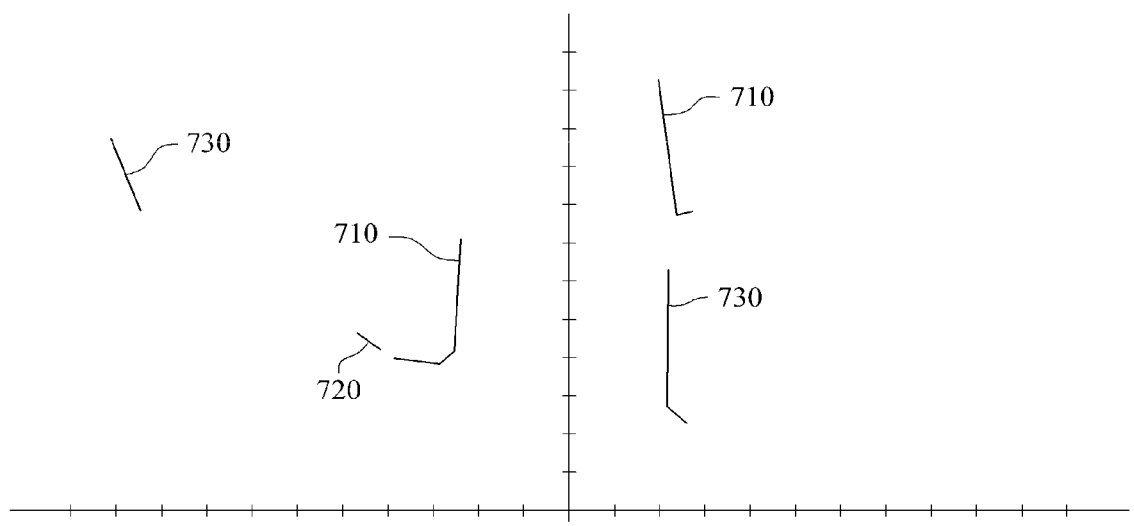
FIG. 7 illustrates an obstacle classification.

Obstacle classification is illustrated in FIG. 7 where lines 710 refer to L-shaped obstacles, lines 720 to possible pedestrians, and lines 730 to generic obstacles.

F. Temporal and Shape-Based Correlation

The classification explained in the previous subsection classifies all the tiny obstacles as possible pedestrian. Even if it is possible that all pedestrians are correctly classified, a number of false positives are present. Fixed obstacles along the road (especially parked vehicles) are here used to localize critical areas in front of the vehicle, in order to focus the attention in the immediate proximity of the edges of this risky area, where pedestrians can pop out and become dangerous.

Polylines provided by the previous scans may be moved according to ego-motion; then the overlap between the current polylines and the previous ones is checked in order to provide a new classification in the following 4 classes: moving obstacle, static obstacle, changing shape obstacle, and new obstacle.

Scan data referring to moving obstacles should have little or no spatial overlap when the time window is large, but unfortunately, the side of a moving vehicle appears as static (high spatial overlap). Anyway, thanks to the previous labeling of L-shaped obstacles, the bumper and the sides of the same vehicle belong to the same object which therefore inherits the 'moving' label.

Obstacles that are represented by well overlapping scans in the given time window are marked as static, even when the newer scan lines are longer and more accurate than the older ones (due to the vehicle getting closer and closer to the obstacle).

Whenever scanlines are detected which overlap only in some regions and differ in others, the object is classified as a changing shape obstacle. This may happen when some new road player (such as a pedestrian or a vehicle which was previously occluded) comes into the scene: being close to another object, in the laser data it appears as its shape were connected to the shape of its adjacent obstacle. It may also happen when a driver of a stopped vehicle opens the door and gets out of the vehicle.

When there is no correspondence between the current polyline and old ones, the object is classified as a new obstacle.

Moving obstacles are discarded; static obstacles are important to locate the areas of interest in which vision will search for pedestrians; changing shape obstacles are of basic importance since they may contain a pedestrian in a very precise region of their shape; and finally new obstacles locate other areas of interest in which vision will have to work.

G. Risky Area Identification

All the information obtained in the previous steps can be used to identify the environment (static obstacles and vehicles) and the moving obstacles (pedestrians and vehicles). Obstacles identified as static by the second classification, and not classified as moving by the former, are used to define the structure of the environment. Also changing shape obstacles are used to build the environment, considering only points that are not changing. Non-moving obstacles in the right and left part of the road in front of the vehicle are used to build the right and left border of the risky area, namely the area that may be reached by the vehicle in the near future, as shown in FIG. 8.

Figure 8:
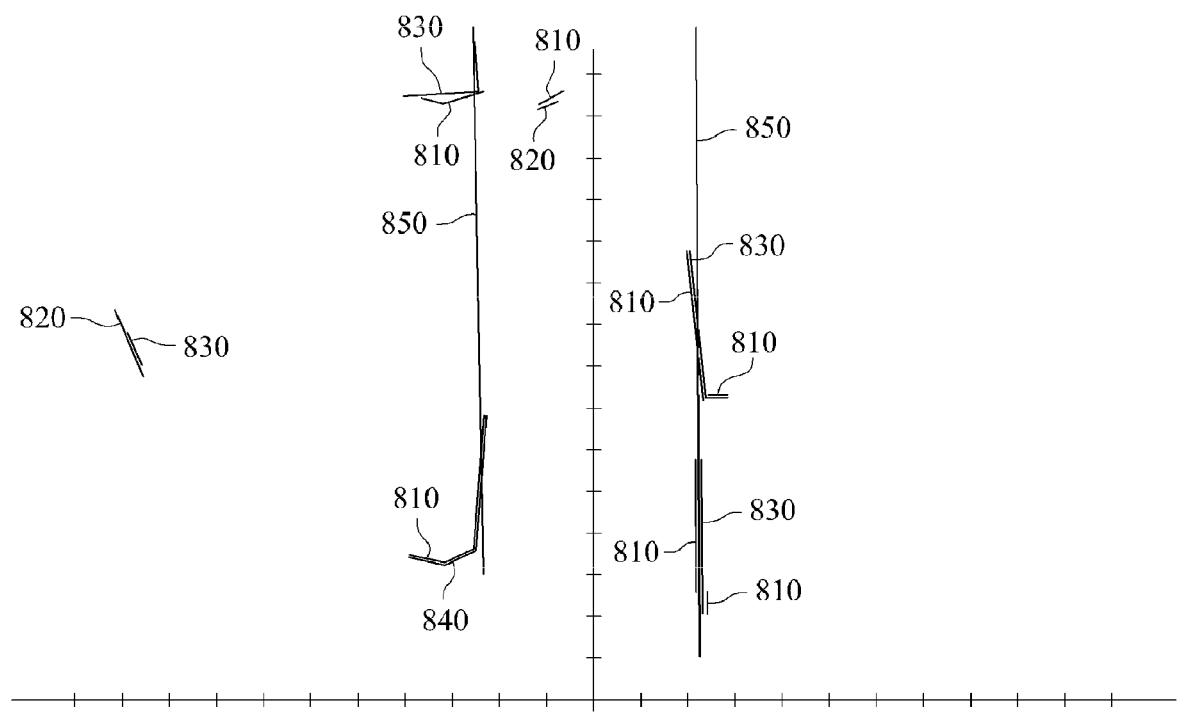
FIG. 8 illustrates an obstacle classification and a risky are.

FIG. 8 shows the obstacle classification and risky area. Here, lines 810 are position of obstacles provided by previous scans, line 820 is a moving obstacle, lines 830 are static obstacles, line 840 is a changing shape obstacle, while lines 850 represent left and right borders of critical or risky area.

Obstacles moving in the risky area may be tagged as risky obstacles. Attention may be especially focused on the areas between static obstacles. Dangerous pedestrians that need to be detected will appear behind a static obstacle or will modify the shape of a static obstacle.

H. Results of the Attentive Process

Figure 9:
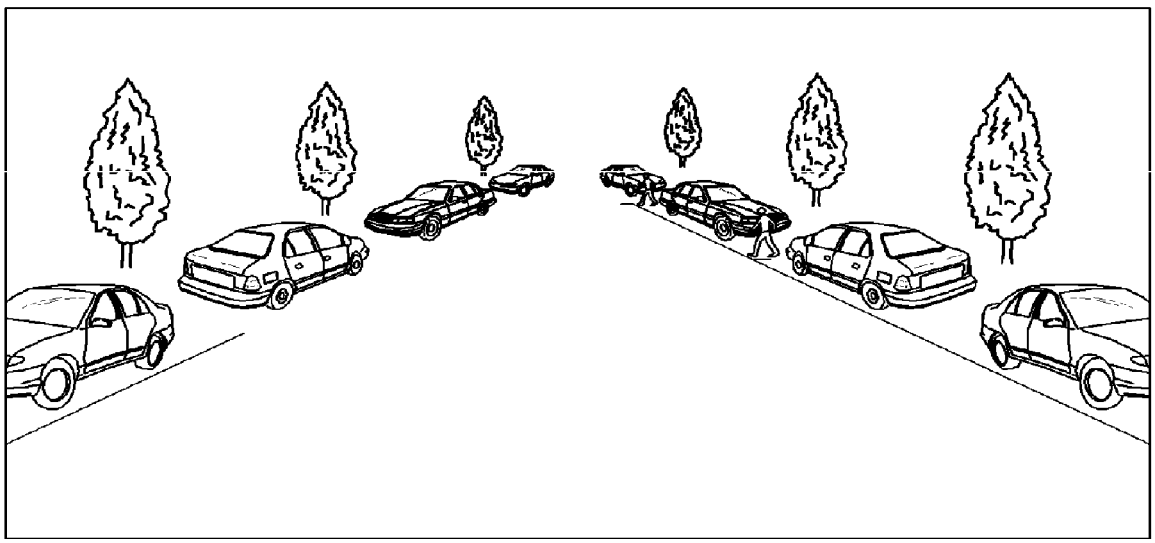
FIG. 9 illustrates pedestrians correctly identified.
Figure 10:
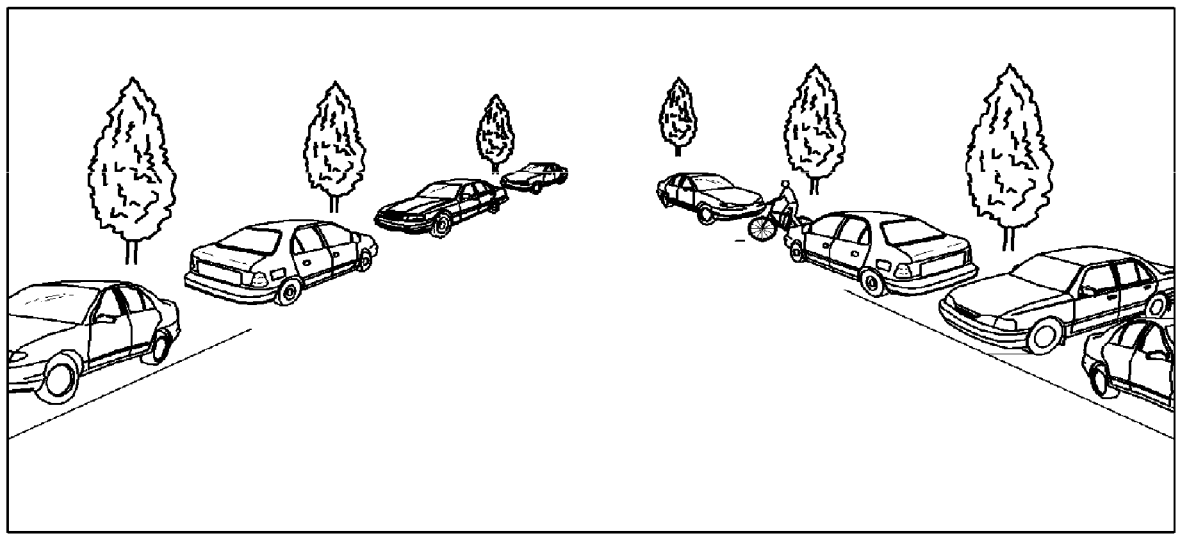
FIG. 10 illustrates obstacles correctly identified.

FIGS. 9 and 10 illustrate pedestrians and obstacles correctly identified, respectively.

Thanks to the projection of laser data on images, FIG. 9 shows a case where a pedestrian is popping out behind a parked vehicle and another pedestrian is walking in the risky area. Both pedestrians are correctly detected. FIG. 10 shows a van popping out from a parking and a cyclist riding near the parked vehicles: both dangerous obstacles are correctly detected. The execution time is less than 5 milliseconds using a Pentium 4 2.8 GHz PC; about 48 milliseconds remain to the vision fusion to keep real-time constraints.

IV. Vision Fusion

Regions of interest are 2D areas in world coordinates; their corresponding areas in the image are then located thanks to camera calibration and perspective mapping. Indeed camera calibration, and more generally system calibration, plays a basic role in a fusion system and needs to be tackled.

Vehicle's pitch during motion may change camera orientation with respect to the world, but—most importantly—it also causes the laser scanner to scan the scene using a different orientation. For on-road applications this is generally considered a limited issue for short distance sensing, and this is even less important when obstacles are vertical. Conversely, in case of appreciable vehicle's pitch angles—especially negative angles that point the laser scanner towards the ground—the laser scanner's scanning plane may intersect the ground and therefore yield non significant results.

Figure 11:
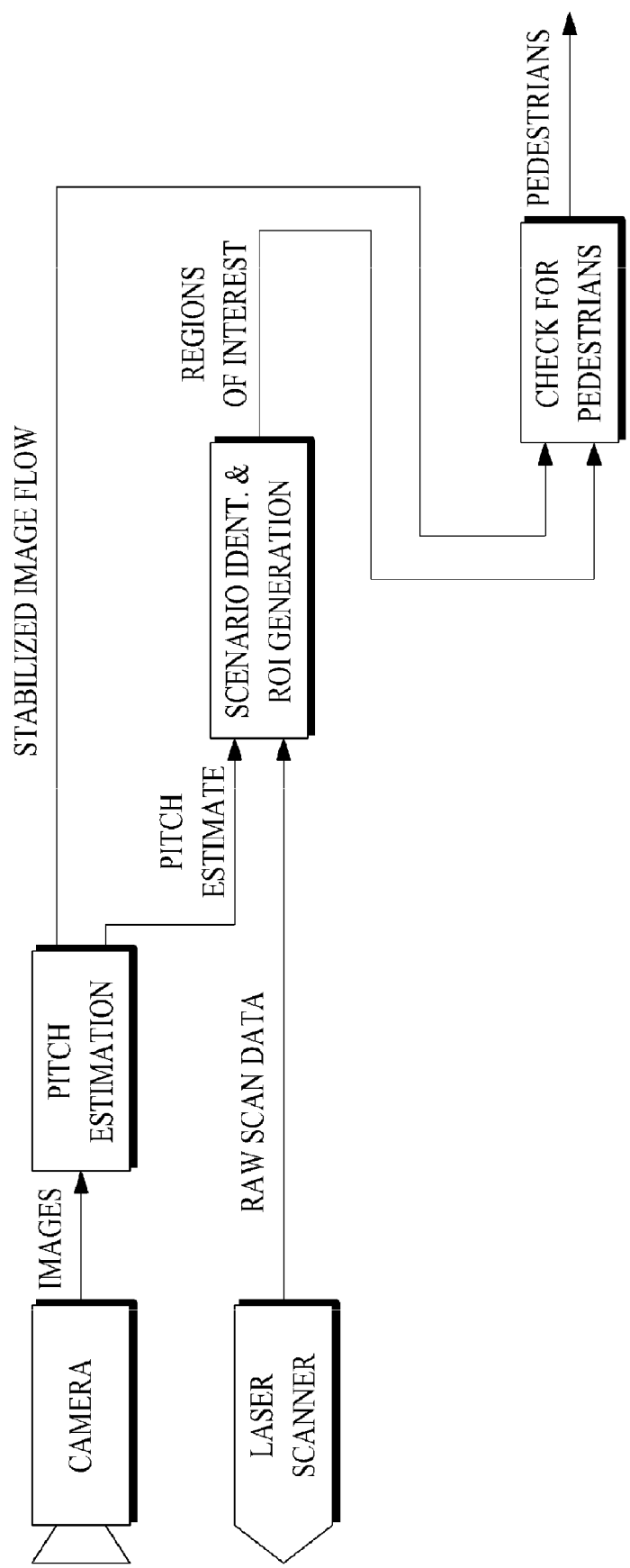
FIG. 11 illustrates a scheme used to fuse vision and laser scanner data.

Thanks to the fact that the two sensors are fixed to the vehicle's frame, they move accordingly and a single compensation may be sufficient. Vision, besides being used to locate pedestrians' features in the regions of interest, may be also used to estimate vehicle's pitch. An additional accelerometer is now being used to check pitch measurement results provided by vision. Instantaneous vehicle's pitch is fed to the laser scanner processing (in order to inhibit the generation of wrong results during vehicle pitching), and is also used to stabilize the image stream, as shown in FIG. 11, which illustrates a scheme used to fuse vision and laser scanner data.

Once the areas of attention are located, the search for pedestrians is triggered using AdaBoost classifier. The identified areas may be resampled to a fixed size (50×20) and all the pixels may be used as input. AdaBoost may be trained using areas individuated by the previous steps of the algorithm and manually marked as pedestrian or not.

V. Conclusions

This disclosure presented a new scheme to increase safety and possibly avoid collisions with vulnerable road users. Instead of implementing a generic pedestrian detection system followed by both a validation step and the assessment of the danger level, this work proposes an innovative approach.

Whenever a specific environment structure is detected (i.e. stopped vehicles that may hide pedestrians), the possible presence of pedestrians is checked in specific areas. Not only this solution approaches the problem from a different perspective with respect to traditional implementations, but it also focuses on a particularly critical environment, typical of urban accidents. Besides directly providing detections of dangerous situations, it also boosts timing performance, since the computationally intensive part—vision-based pedestrian recognition—is performed only on limited portions of the image. Speed-up due to the critical area localization step can be measured as the difference between the number of possible pedestrians generated by a classical system (that considers only size to locate pedestrians) and the ones generated by this method: several tests in urban scenarios show that the proposed method provide on average less than a quarter of possible pedestrians than classical system.

Figure 12:
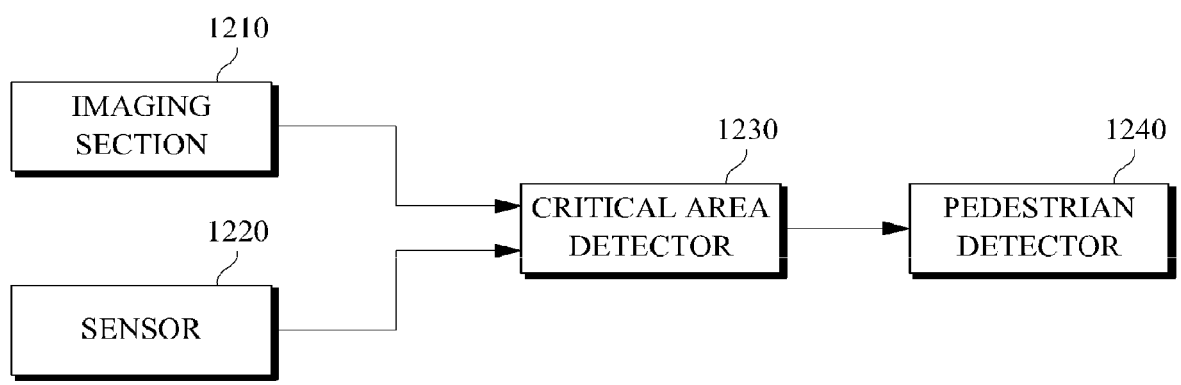
FIG. 12 is a block diagram of an electronic construction of a pedestrian detection apparatus using detection of critical areas according to an embodiment of the present disclosure.

FIG. 12 is a block diagram of an electronic construction of a pedestrian detection apparatus using detection of critical areas according to an embodiment of the present disclosure.

The pedestrian detection apparatus is adapted to detect pedestrians straying about vehicles and may comprise a camera 1210 for imaging an environment of the vehicles to generate and deliver image outputs, a sensor 1220 for sensing obstacles about the vehicles to deliver distance data, a critical area detector 1230 using the distance data to identify the vehicle environment and moving obstacles and detect as critical areas a preset environment and the areas surrounding the moving obstacles and a pedestrian detector 1240 for detecting pedestrians preferentially from the images corresponding to the critical areas. Here, imaging section 1210 may comprise a near infrared or NIR camera and a plurality of NIR LED headlights. In addition, only upon occurrence of moving obstacles in detecting pedestrians from the images or selected candidate images, pedestrian detector 1240 may preferentially detect pedestrians from the area images that correspond to the critical areas.

Critical area detector 1230 of the pedestrian detection apparatus detects critical areas and upon receiving the distance data generated from detecting the environmental obstacles of the vehicles, identifies the environment of the vehicles and moving obstacles using the distance data in order to detect as critical areas a preset environment and the areas surrounding the moving obstacles.

Additionally, critical area detector 1230 may find a zero speed vehicle through evaluating obstacle speeds by receiving the distance data from sensor 1220, which is equipped with an interlaced scanning laser scanner. Further, critical area detector 1230 may comprise a data correction section to receive the distance data from sensor 1220 and correct the same following the positional changes of the vehicles, a data clustering section for connecting between the corrected distance data in a close proximity and clustering them as chains of segments, a segment merging section for connecting the clustered distance data segments to merge the adjacent segments with approximately the same orientation into a polyline, a lines merging section for integrating the polylines in a close proximity into a single merged line, a first obstacle classification section for classifying the obtained polylines according only to their size and shape into multiple categories in order to detect multiple categories of obstacles, a second obstacle classification section for correcting the polylines according to the vehicle positional changes and classifying the polylines into multiple categories according to the overlapping between the polylines before correction and the polylines after correction in order to detect multiple categories of obstacles, and a risky area identification section for identifying the environment and the moving obstacles by using the multiple categories of obstacles detected in the first and second obstacle classification sections.

Also, the data correction section may correct the distance data by calculating the vehicle roto-translation using the ego-motion data received from the vehicle CAN. The data clustering section may cluster the distance data by connecting among continuous pulses of the distance data only the ones that belong to the same rotation. The first obstacle classification section may detect one or more of multiple categories of obstacles including a possible pedestrian, road border, L-shaped obstacle, moving obstacle, and generic obstacle. The second obstacle classification section is a module that carries out the temporal and shape-based correlation to generate corrected polylines by moving the polylines according to ego-motion. Also, the second obstacle classification section can detect one or more of multiple categories of obstacles including a moving obstacle, static obstacle, changing shape obstacle, and new obstacle.

Figure 13:
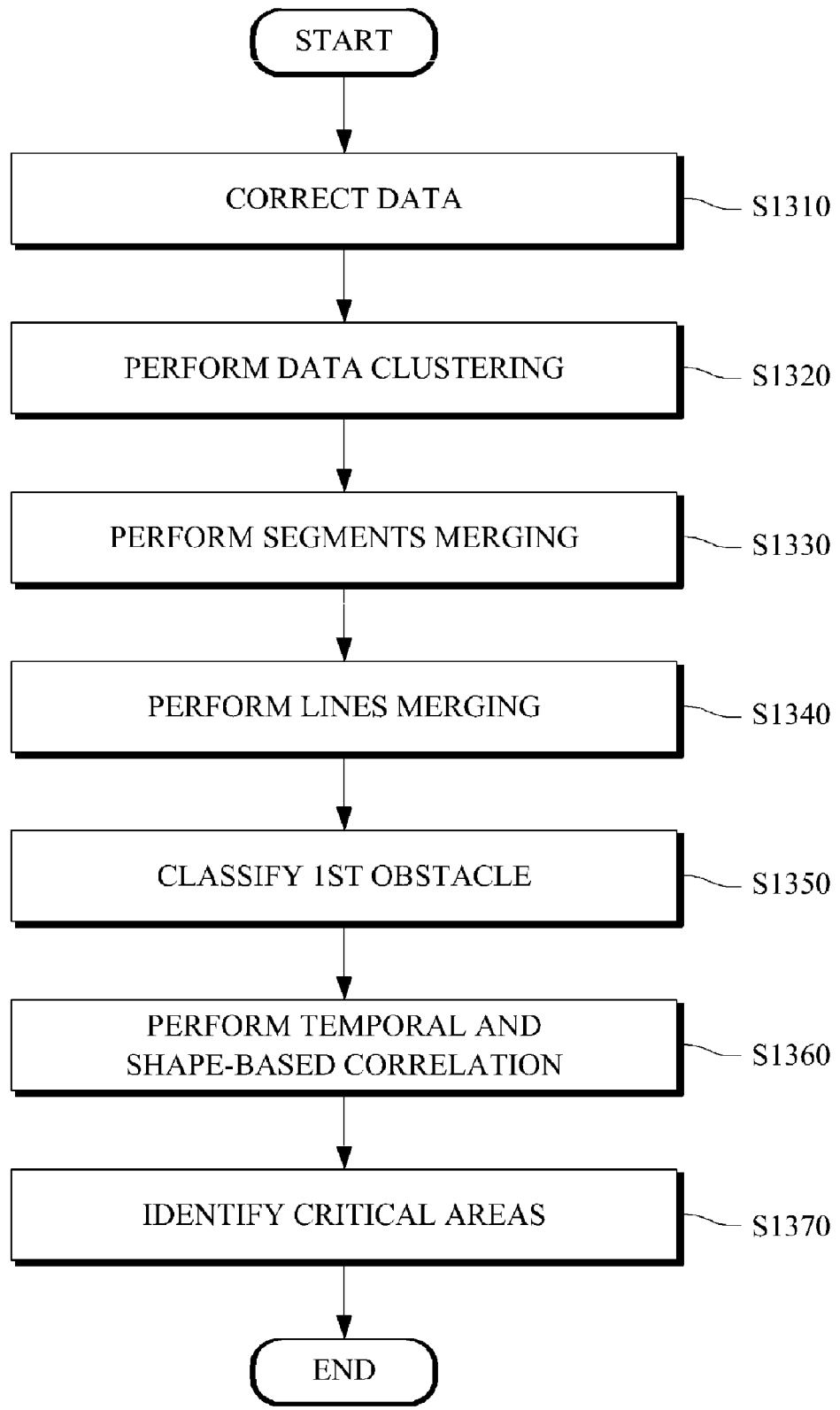
FIG. 13 is a flow chart for illustrating a critical area detection method according to an embodiment of the present disclosure.

FIG. 13 is a flow chart for illustrating a critical area detection method according to an embodiment of the present disclosure.

When vehicle on-board sensor 1220 detects through a laser scanning the vehicle atmospheric obstacles and generates the distance data, critical area detector 1230 may receive the distance data from sensor 1220 and corrects the received distance data according to the positional change of the vehicle in step S1310.

Critical area detector 1230 having the distance data corrected may connect between the corrected distance data in a close proximity and cluster them as chains of segments in a step S1320. It connects the clustered distance data segments so that the adjacent segments with approximately the same orientation are merged into a polyline in a step S1330. Then, the polylines in a close proximity are integrated to a single merged line in step S1340.

In addition, critical area detector 1230 detects multiple categories of obstacles by classifying the obtained polylines according only to their size and shape into multiple categories in step S1350 and by correcting the polylines according to the vehicle positional changes and then classifying the polylines into multiple categories according to the overlap between the polylines before correction and the polylines after correction in step S1360.

Further, critical area detector 1230 identifies the atmosphere and moving obstacles with using collected information from steps S1310 to S1350 and specifically the multiple categories of obstacles detected in the steps S1350 through S1360 in order to identify the critical areas in step S1370 before ending critical area detection method of the disclosure.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Nor is the technical scope of the present disclosure limited by the current embodiments. Accordingly, the scope of the disclosure is to be limited by the claims and the equivalents thereof.

What is claimed is:

1. A pedestrian detection apparatus for detecting pedestrians about a vehicle comprising:
    an image generator for capturing images of an environment of the vehicle to generate and deliver image outputs;
    a sensor for sensing obstacles about the vehicle and delivering distance data between the obstacles and the vehicle;
    a critical area detector for generating polylines by clustering a plurality of the distance data and classifying obtained polylines according to their size and shape into multiple categories in order to detect multiple categories of obstacles; and
    a pedestrian detector for detecting the pedestrians preferentially from images corresponding to the critical areas.

2. The pedestrian detection apparatus in claim 1, wherein the image generator comprises a near infrared camera and a plurality of near infrared LED headlights.

3. The pedestrian detection apparatus in claim 1, wherein the pedestrian detector preferentially detects pedestrians from the images that correspond to the critical areas only upon occurrence of the moving obstacles during a detection of pedestrians from the images or selected candidate images.

4. A critical area detector in a pedestrian detection apparatus for detecting pedestrians about vehicles comprising:
    a critical area detection unit, which upon receiving a distance data generated from detecting environmental obstacles of the vehicles, generates polylines by clustering a plurality of the distance data and classifies obtained polylines according to their size and shape into multiple categories in order to detect multiple categories of obstacles.

5. The critical area detector in claim 4, receiving the distance data from a sensor, which is equipped with an interlaced scanning laser scanner.

6. The critical area detector in claim 4, wherein the critical area detection unit comprises:
    a data correction section to receive the distance data from a sensor and correct the same according to the positional changes of the vehicles;
    a data clustering section for connecting between the corrected distance data in a close proximity and clustering them as chains of segments;
    a segment merging section for connecting the clustered distance data segments to merge adjacent segments with approximately the same orientation into a polyline;
    a line merging section for integrating the polylines in a close proximity into a single merged line;
    a second obstacle classification section for correcting the polylines according to the vehicle positional changes and classifying the polylines into multiple categories according to the degree of overlap between the polylines before correction and the polylines after correction in order to detect multiple categories of obstacles; and
    a critical area identification section for detecting the critical areas by identifying the environment and the moving obstacles with using the multiple categories of obstacles detected in the first and second obstacle classification sections.

7. The critical area detector in claim 6, wherein the correction section corrects the distance data by calculating a vehicle roto-translation using ego-motion data received from a vehicle CAN.

8. The critical area detector in claim 6, wherein the data clustering section clusters the distance data by connecting among continuous pulses of the distance data only the ones that belong to the same rotation.

9. The critical area detector in claim 6, wherein the first obstacle classification section detects one or more of multiple categories of obstacles including a possible pedestrian, road border, L-shaped obstacle, moving obstacle, and generic obstacle.

10. The critical area detector in claim 6, wherein the second obstacle classification section generates the corrected polylines by moving the polylines according to ego-motion.

11. The critical area detector in claim 6, wherein the second obstacle classification section detects one or more of multiple categories of obstacles including a moving obstacle, static obstacle, changing shape obstacle, and new obstacle.

12. A critical area detection method in a pedestrian detection apparatus for detecting pedestrians about a vehicle comprising:
    (a) correcting a distance data upon receiving the same from a sensor according to positional changes of the vehicle;
    (b) clustering the distance data as chains of segments by connecting between corrected distance data in a close proximity;
    (c) merging the segments by connecting the clustered distance data segments and merging the segments in parallel and in a close proximity into a polyline;
    (d) merging lines by integrating polylines in a close proximity into a single merged line;
    (e) classifying obstacles through classification of polylines according to their size and shape into multiple categories in order to detect multiple categories of obstacles;
    (f) classifying the obstacles through correcting the polylines according to the vehicle positional changes and classifying the polylines into multiple categories according to the degree of overlap between the polylines before correction and the polylines after correction in order to detect multiple categories of obstacles; and
    (g) identifying critical areas through identifying the environment and the moving obstacles by using the multiple categories of obstacles detected in steps (e) and (f) of classifying the obstacles in order to detect the critical areas.

* * * * *